(12) United States Patent
Cheng et al.

(10) Patent No.: US 9,504,048 B2
(45) Date of Patent: Nov. 22, 2016

(54) METHOD AND FULL-DUPLEX COMMUNICATION DEVICE FOR ACQUIRING CHANNEL RESPONSE OF SELF-INTERFERING CHANNEL

(71) Applicant: Huawei Technologies Co., Ltd., Shenzhen, Guangdong (CN)

(72) Inventors: Hong Cheng, Guangdong (CN); Rui Wang, Guangdong (CN); Yinggang Du, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 14/577,328

(22) Filed: Dec. 19, 2014

(65) Prior Publication Data

US 2015/0103802 A1 Apr. 16, 2015

Related U.S. Application Data

(63) Continuation of application No. PCT/CN2013/070163, filed on Jan. 7, 2013.

(30) Foreign Application Priority Data

Jun. 25, 2012 (CN) .......................... 2012 1 0209699

(51) Int. Cl.
| | |
|---|---|
| H04W 72/08 | (2009.01) |
| H04L 5/00 | (2006.01) |
| H04L 5/14 | (2006.01) |
| H04L 25/02 | (2006.01) |

(52) U.S. Cl.
CPC .......... *H04W 72/082* (2013.01); *H04L 5/0048* (2013.01); *H04L 5/143* (2013.01); *H04L 25/022* (2013.01); *H04L 25/0232* (2013.01)

(58) Field of Classification Search
CPC ........................... H04B 7/0417; H04B 7/0632
See application file for complete search history.

(56) References Cited

U.S. PATENT DOCUMENTS

| 6,618,365 B1 * | 9/2003 | Vannatta ............... H04W 72/08 370/333 |
| 2011/0143655 A1 | 6/2011 | Ahn et al. |

(Continued)

FOREIGN PATENT DOCUMENTS

| CN | 1845472 A | 10/2006 |
| CN | 102281129 A | 8/2011 |

(Continued)

OTHER PUBLICATIONS

Li et al., "Full-Duplex Wireless Communication Using Transmitter Output Based Echo Cancellation," IEEE Global Telecommunications Conference (GLOBECOM 2011), pp. 1-5, Institute of Electrical and Electronics Engineers, New York, New York (Dec. 5-9, 2011).

(Continued)

*Primary Examiner* — Chandrahas Patel
(74) *Attorney, Agent, or Firm* — Leydig, Voit & Mayer, Ltd.

(57) ABSTRACT

Provided are a method and apparatus for acquiring channel responses of a self-interference channel and a full-duplex communication device. The method comprises: obtaining an estimate value of a channel response of the self-interfering channel by employing multiple reference signals to perform a channel estimation on the self-interfering channel; determining a stable range of each channel frequency-domain response on the basis of the channel response estimated value; randomly selecting a frequency point within the stable range of each channel frequency-domain response or selecting a frequency point of a greater channel response to serve as an emission frequency point of the reference signals, and, when an interrelation of the channel responses on the emission frequency point and on a non-emission frequency point is acquired, acquiring all the channel responses on time-domain and frequency-domain on the basis of a reception signal corresponding to the reference signals on the emission frequency point.

9 Claims, 5 Drawing Sheets

(56) References Cited

U.S. PATENT DOCUMENTS

| | | |
|---|---|---|
| 2011/0194633 A1 | 8/2011 | Zhang et al. |
| 2014/0286185 A1 | 9/2014 | Liu et al. |

FOREIGN PATENT DOCUMENTS

| | | | |
|---|---|---|---|
| CN | 102281129 A | | 12/2011 |
| CN | 102404258 A | | 4/2012 |
| CN | 102404258 A | | 9/2014 |
| WO | WO 2004107596 A1 | | 12/2004 |

OTHER PUBLICATIONS

"Full Duplex Multiplexing of Un and Uu Subframes," 3GPP TSG RAN WG1 Meeting #60, San Francisco, California, R1-101197, $3^{rd}$ Generation Partnership Project, Valbonne, France (Feb. 22-26, 2010).

\* cited by examiner

METHOD AND FULL-DUPLEX COMMUNICATION DEVICE FOR ACQUIRING CHANNEL RESPONSE OF SELF-INTERFERING CHANNEL

CROSS-REFERENCE TO RELATED APPLICATIONS

This application is a continuation of International Patent Application No. PCT/CN2013/070163, filed on Jan. 7, 2013, which claims priority to Chinese patent application No. 201210209699.3 filed on Jun. 25, 2012, both of which are hereby incorporated by reference in their entireties.

FIELD OF THE TECHNOLOGY

The present application relates to the field of communication technology, particularly to a method for acquiring channel responses of a self-interference channel and a full-duplex communication device.

BACKGROUND

In an operator's mobile network, a Base Station (BS) communicates with multiple User Equipments (UE) within coverage. The communication between the BS and the UE is two-way. A process of transmitting signals to a UE by a BS is called downlink communication, while a process of transmitting signals to a BS by a UE is called uplink communication.

A duplex mode refers to a multiplexing mode between an uplink and a downlink. At present, duplex modes include simplex, half-duplex and full-duplex. In Simplex refers to the case that communication is one-way, where a transmitter is only capable of transmitting signals while a receiver is only capable of receiving signals, and signals can only be transmitted from the transmitter to the receiver. Half-duplex refers to the case that communication is two-way, but there is only uplink transmission or downlink transmission in a same transmission resource, where both sides of the transmission can not only transmit signals but also receive signals, but the transmitting and receiving of a same transceiver occurs at different transmission resources (time, frequencies, or orthogonal codes). Full-duplex refers to the case that a transceiver performs two-way transmission at a same transmission resource.

Particularly to a cellular network, communication between a BS and a UE is two-way, and all existing cellular communication systems and standards nowadays are half-duplex. According to various manners to divide uplink and downlink on transmission resource, cellular networks may be classified into two categories which are Frequency Division Duplexing (FDD) systems and Time Division Duplexing (TDD) systems. In a TDD system, an uplink and a downlink are distinguished by different timeslots. For example, in a Long Term Evolution (LTE) system, a frame is divided into an uplink subframe and a downlink subframe for uplink transmission and downlink transmission, respectively; and in general, to avoid interference between uplink and downlink, a protection subframe is introduced in TDD system when transitioning from a downlink subframe to a uplink subframe (a protection subframe may be not introduced when transitioning from an uplink subframe to a downlink subframe, because time for transition can be controlled by BS), and relative synchronization of the entire network is kept. FDD refers to the case that an uplink and a downlink are distinguished by different spectra; and in general, to avoid interference between uplink and downlink, a protection band is reserved between an uplink spectrum and a downlink spectrum in a FDD system.

Simultaneous transmission in uplink and downlink in a same time-frequency resource is achieved by full-duplex technology. Spectral efficiency of full-duplex is double of spectral efficiency of simplex and half-duplex. Current different antennae and radio-frequency channels are used by a transceiver of full-duplex technology for transmitting and receiving, for it has not been testified by an experimental prototype that a required result can be achieved by using a same antenna or radio-frequency channel. A problem needed to be solved by full-duplex technology is how to deal with interference on a received signal by a transmitted signal of a same transceiver. Here, the interference on a received signal by a transmitted signal of a same device is called self-interference.

Figure 1:
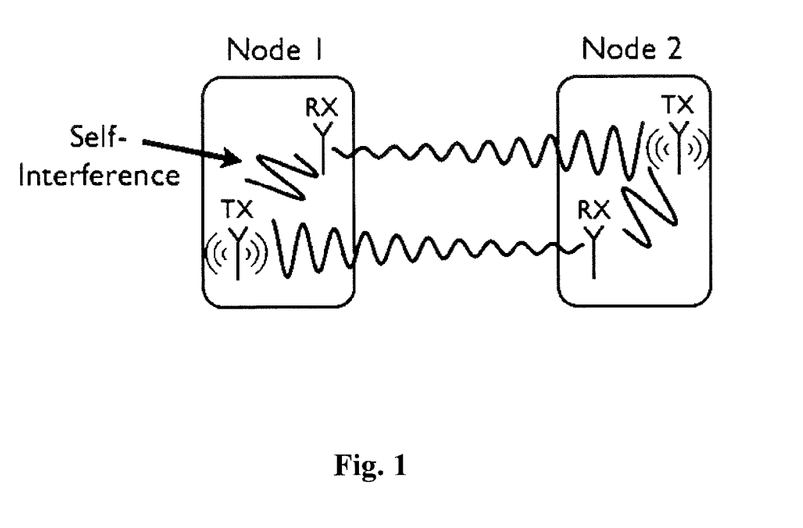
FIG. 1 is a diagram of self-interference between a received signal and a transmitted signal in full-duplex.

A distance between a transmitting antenna and a receiving antenna is very small (usually no more than 10 cm), therefore, power of a transmitted signal received by a receiving antenna is very large. The very strong self-interference must be handled at an analog front end, otherwise the very strong self-interference will cause congestion at the analog front end (exceeding a linear range of a receiving amplifier and making the received signal smaller than a quantization precision of an analog-to-digital converter (ADC)). Self-interference between a received signal and a transmitted signal in full-duplex is shown in FIG. 1. With a path loss model of current macro base station as an example, $L=128.1+37.6 \log 10(R)$, where L indicates a path loss, i.e., attenuation of signal intensity with distance; R indicates a distance in unit of Km. A path loss from a terminal, which is 200 m far from a macro base station, to the macro base station is 102 dB, while a path loss from a transmitting antenna to a receiving antenna of a same transceiver is generally 40 dB. It is obvious that even in a case that the UE has the same power as the base station, self-interference of the base station is 62 dB stronger than a received uplink signal. Therefore, at present, research in full-duplex technology focuses on how to perform self-interference cancellation. At present, methods for self-interference cancellation include 3 aspects which are antenna, analog, and digital.

A full-duplex communication device corresponds to two different channels which are a self-interference channel from a transmitting antenna to a receiving antenna on a same communication device, and a transmission channel between two communication devices.

The self-interference channel is a frequency-selective channel which varies slowly with time. Between the transmitting antenna and the receiving antenna there is a multi-path channel. In frequency domain, multi-path delay spread is small, so a multipath channel can be considered as a flat fading channel when bandwidth is small. However, the self-interference is very strong compared with a received signal, so accurate channel estimation is needed to accurately reconstruct interference, and then frequency density of reference signals used for self-interference channel estimation is required to be high. In time domain, multipath between a transmitting antenna and a receiving antenna of the same communication device mainly results from reflection and refraction in the body of the communication device, and positions of the transmitting antenna and the receiving antenna and a shape of the body are fixed, therefore, the channel in time domain vary slowly with ambient environment.

A transmission channel between two communication devices in a typical scene is a time-varying frequency selective channel. In frequency domain, multipath delay of a signal between two communication devices is large, so the channel response varies significantly in frequency domain and channel estimate needs to be performed with reference signals dense in frequency domain. In time domain, due to movement of the two communication devices or movement of ambient reflectors and refractors, the channel response varies significantly in time domain, therefore, reference signals dense in time domain are needed for channel estimation.

Channel responses of the two channels need to be estimated separately. When estimating a transmission channel, a full-duplex communication device leaves blank at a position where a communication device at the other end transmits a reference signal, so that a receiving path estimates according to the transmitted reference signal. When estimating a self-interference channel, the communication device at the other end needs to leave blank at a position where the local full-duplex communication device transmits a reference signal of the self-interference channel. Although at a side of the receiving antenna, intensity of the reference signal of the self-interference channel is much larger than that of a signal from another communication device, the signal intensity after self-interference cancellation is comparable with intensity of the received signal, therefore, it is necessary for the communication device at the other end to leave blank at the position corresponding to the reference signal.

In a full-duplex communication device, one communication device corresponds to multiple channels very different in time-varying characteristics. Reference signals with a same time domain interval are used to estimate each channel.

All existing standards are half-duplex communication, where there is no mutual interference between a transmitting antenna and a receiving antenna of a same communication device, so only reference signals for estimating a transmission channel response between two communication devices are designed in current standards.

The description, although made by taking a reference signal of an LTE system as an example, is certainly applicable to other Orthogonal Frequency Division Multiplexing (OFDM) systems/Orthogonal Frequency Division Multiple Access (OFDMA) systems.

Figure 2:
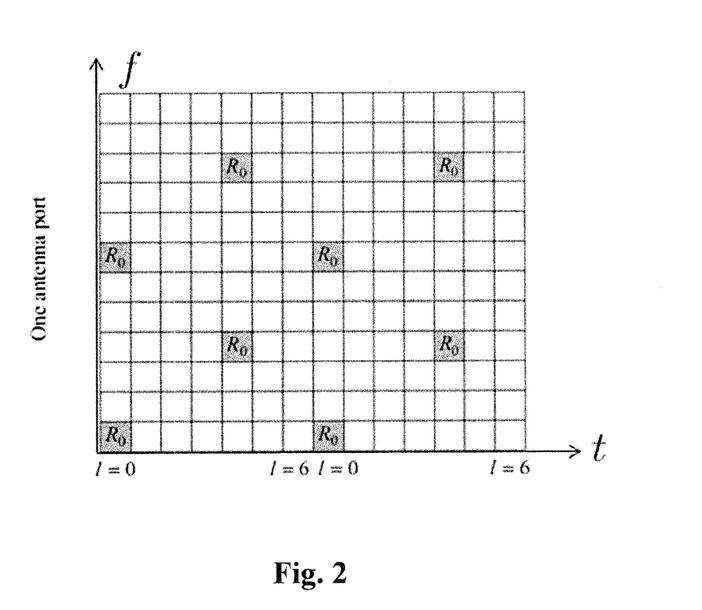
FIG. 2 is a distribution diagram of reference signals of an LTE system.

In an LTE system, a minimum unit for transmitting time-frequency resources is a time-frequency resource element. Each time-frequency resource element is constituted of an OFDM symbol and a subcarrier. Channel estimation is performed by transmitting a known signal (a reference signal) on selected time-frequency resource elements dispersing in time domain and in frequency domain among available time-frequency resource elements. A frequency domain interval between reference signal elements is less than coherence bandwidth (inversely proportional to multipath delay spread) in a typical scattering scene, and a time domain interval is less than coherence time (inversely proportional to frequency domain Doppler spread) in a typical movement scene. A distribution of reference signals in an LTE system is shown in FIG. 2, where 1 indicates a timeslot.

In existing technology, reference signals are designed according to characteristics of time domain variation and frequency domain variation of a transmission channel between point-to-point communication devices. For a full-duplex communication device, it is required to estimate two channels (a self-interference channel and a transmission channel) at the same time and the two channels are very different in terms of characteristics of time domain variation and frequency domain variation. For the self-interference channel with frequency domain variation relation varying slowly with time, conventionally an amount of reference signals used for channel estimation is the same as that used for estimation of transmission channel, and time-frequency resource for data transmission is increased.

Technical Problem

A method for acquiring channel responses of a self-interference channel and a full-duplex communication device are provided in embodiments of the invention, which are aimed to solve conventional problems in which the characteristic that the frequency domain variation relation of the self-interference channel varies slowly with time is not utilized in channel estimation of the self-interference channel and hence time-frequency resource for data transmission is increased.

Technical Solutions

In one aspect, a method for acquiring channel responses of a self-interference channel is provided, and the method includes:

obtaining an estimate value of a channel response of the self-interfering channel by performing channel estimation for the self-interference channel through using a plurality of reference signals, where a time interval between adjacent reference signals is less than a coherence time of the self-interference channel, and a frequency-domain interval between adjacent reference signals is less than coherence bandwidth of the self-interfering channel;

determining an interval with stable frequency domain response of the self-interference channel according to the estimate value of the channel response of the self-interference channel;

selecting, from the interval with stable frequency domain response of the self-interference channel, a random frequency point or a frequency point with a relatively significant channel response as a transmission frequency point for a reference signal;

acquiring an interrelation between channel responses at a transmission frequency point and at a non-transmission frequency point;

transmitting the reference signal at the transmission frequency point;

calculating a channel response $\hat{H}_r$ at the transmission frequency point according to a received signal $Y_r$ at the transmission frequency point;

calculating a channel response $H_i$ at the non-transmission frequency point according to the channel response $\hat{H}_r$ at the transmission frequency point and the interrelation between channel responses at the transmission frequency point and at the non-transmission frequency point; and estimating channel responses in all time domain and frequency domain by performing interpolation separately or simultaneously in frequency domain and time domain.

In another aspect, an apparatus for acquiring channel responses of a self-interference channel is provided, and the apparatus includes:

an estimate value acquisition unit, configured to obtain an estimate value of a channel response of the self-interfering channel by performing channel estimation for the self-interference channel through using a plurality of reference signals, where a time interval between adjacent reference signals is less than a coherence time of the self-interference channel, and a frequency-domain interval between adjacent reference signals is less than coherence bandwidth of the self-interfering channel;

a stable interval acquisition unit, configured to determine an interval with stable frequency domain response of the self-interference channel according to the estimate value of the channel response of the self-interference channel;

a transmission frequency point determination unit, configured to select, from the interval with stable frequency domain response of the self-interference channel, a random frequency point or a frequency point with a relatively significant channel response as a transmission frequency point for a reference signal;

an interrelation acquisition unit, configured to acquire an interrelation between channel responses at a transmission frequency point and at a non-transmission frequency point;

a reference signal transmission unit, configured to transmit the reference signal at the transmission frequency point;

a first channel response acquisition unit, configured to calculate a channel response $\hat{H}_r$ at the transmission frequency point according to a received signal $Y_r$ at the transmission frequency point;

a second channel response acquisition unit, configured to calculate a channel response $H_t$ at the non-transmission frequency point according to the channel response $\hat{H}_r$ at the transmission frequency point and the interrelation between channel responses at the transmission frequency point and at the non-transmission frequency point; and a third channel response acquisition unit, configured to estimate channel responses in all time domain and frequency domain by performing interpolation separately or simultaneously in frequency domain and time domain.

In yet another aspect, a full-duplex communication device is provided, and the full-duplex communication device includes the foregoing apparatus for acquiring channel responses of a self-interference channel, the full-duplex communication device further includes a self-interference channel response acquisition module, and the self-interference channel response acquisition module is configured to acquire channel responses in all time domain and frequency domain calculated by the apparatus for acquiring channel responses of the self-interference channel.

Beneficial Effects

In embodiments of the invention, a random frequency point or a frequency with a relatively significant channel response is selected, only within a interval with stable frequency domain response for each channel, as a transmission frequency point for the reference signal, and then channel responses at all frequency points are calculated according to a received signal corresponding to the reference signal at the transmission frequency point and the interrelation between channel responses at the transmission frequency point and at the non-transmission frequency point. Compared with conventional technologies, resource of reference signals for self-interference channel estimation is saved.

DETAILED DESCRIPTION OF THE EMBODIMENTS

The purpose, technical solutions and advantages of the disclosure will be clearer from the further detailed description below in combination with drawings and embodiments. It should be understood that the particular embodiments described herein are merely to explain the disclosure, rather than to limit the disclosure.

In the embodiments of the invention, an interval with stable frequency domain response is determined for each channel at first, and then a random frequency point or a frequency point with a relatively significant channel response is selected from the interval with stable frequency domain response of each channel, as a transmission frequency point for a reference signal, and after an interrelation between channel responses at the transmission frequency point and at a non-transmission frequency point is acquired, channel responses in all time domain and frequency domain are obtained according to received signals corresponding to the reference signal at the transmission frequency point.

Implementation of the disclosure is described below in detail in combination with particular embodiments.

First Embodiment

Figure 3:
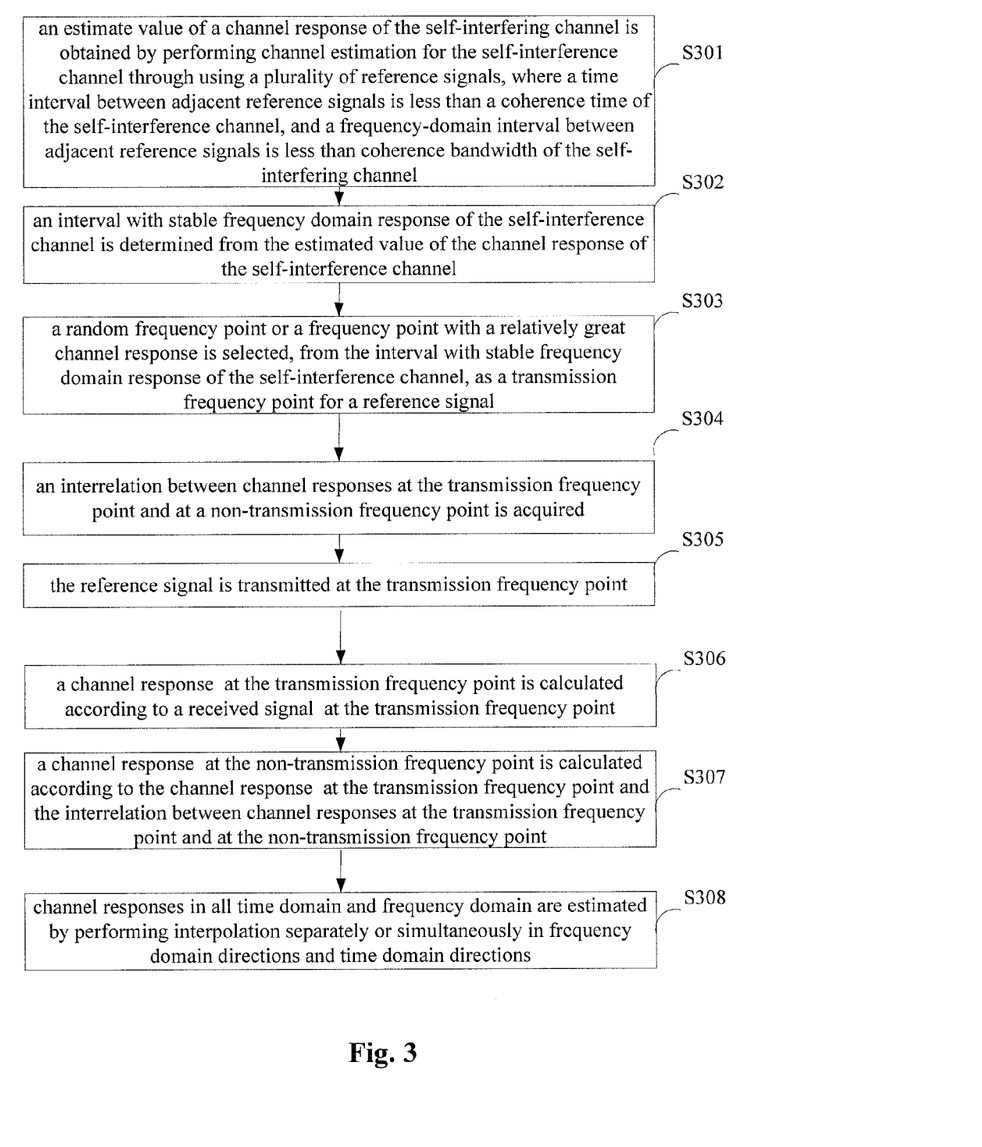
FIG. 3 is a flow chart of implementation of a method for acquiring channel responses of a self-interference channel provided in a first embodiment of the invention.

FIG. 3 is a flow chart of implementation of a method for acquiring channel responses of a self-interference channel provided in a first embodiment of the invention. For convenience of description, the embodiment is described in a scene of an LTE system. The embodiment is also applicable to other OFDM/OFDMA communication systems. In the embodiment, an interrelation between channel responses at different frequency points is considered as fixed in frequency domain, which is described in detail as follows:

In Step S301, an estimate value of a channel response of the self-interfering channel is obtained by performing channel estimation for the self-interference channel through using a plurality of reference signals, where a time interval between adjacent reference signals is less than a coherence time of the self-interference channel, and a frequency-domain interval between adjacent reference signals is less than coherence bandwidth of the self-interfering channel.

In the embodiment, channel estimation is performed on a self-interference channel directly according to a conventional method for performing channel estimation on a transmission channel, to obtain an estimate value of channel response of the self-interference channel. It can be understood as the case that channel estimation is performed on the self-interference channel by sending multiple reference signals in a way that a density of the reference signals in frequency domain is high.

In Step S302, an interval with stable frequency domain response of the self-interference channel is determined from the estimate value of the channel response of the self-interference channel.

In the embodiment, if a frequency domain variation of the estimate value of the channel response in a certain frequency domain interval follows the rule that a variation within a particular time interval is less then a preset threshold, then the frequency domain interval is considered as an interval with a stable frequency domain response.

In Step S303, a random frequency point or a frequency point with a relatively significant channel response is selected, from the interval with stable frequency domain response of the self-interference channel, as a transmission frequency point for a reference signal.

In Step S304, an interrelation between channel responses at the transmission frequency point and at a non-transmission frequency point is acquired.

For a full-duplex communication device, a frequency domain variation of a channel response of a self-interference channel is caused mainly by reflection and refraction in a body of the full-duplex communication device. For the full-duplex communication device, positions of a transmitting antenna and a receiving antenna and a body shape are fixed, therefore, the frequency domain variation of the channel response of the self-interference channel for the full-duplex communication device almost does not vary with time or varies very slowly.

In the embodiment, according to the characteristic that the frequency domain variation of the channel response of the self-interference channel for the full-duplex communication device almost does not vary with time, an interrelation between channel responses of the self-interference channel at a transmission frequency point and at a non-transmission frequency point is calculated at first.

The specific calculation includes:

Step 1, acquiring a channel response at an r-th frequency point, where the r-th frequency point is a transmission frequency point.

It is supposed that the signal $Y_r=H_r S_r+n_r$ is received at the r-th frequency point at which reference signals are stilled transmitted in subsequent steps to reduce reference signals, where $H_r$ represents a channel response at the frequency point, $S_r$ represents the reference signal sent at the frequency point, density of the reference signals depends on factors such as a degree of fluctuation in frequency domain and required accuracy of the estimation, and $n_r$ represents an additive noise.

In accordance, a channel estimation value $\hat{H}_r$ at the frequency point can be obtained with a Minimum Mean Squared Error (MMSE) algorithm, etc.

Step 2, acquiring a channel response at an i-th frequency point, where the i-th frequency point is a non-transmission frequency point.

Similarly, it is supposed that the signal $Y_i=H_i S_i+n_i$ is received at the i-th frequency point at which no reference signal is transmitted in subsequent steps to reduce reference signals, where $H_i$ represents a channel response at the frequency point, $S_i$ represents the reference signal which should be transmitted at the frequency point, $n_i$ represents an additive noise, i=1, 2, . . . , M, and M is an amount of frequency points where no reference signal is transmitted.

In accordance, a channel estimation value $\hat{H}_i$ at the frequency point at which no reference signal is transmitted can be obtained with the MMSE algorithm, etc.

Step 3, calculating an interrelation between channel responses at the transmission frequency point and at the non-transmission frequency point according to the channel response at the i-th frequency point and the channel response at the r-th frequency point.

Figure 4:
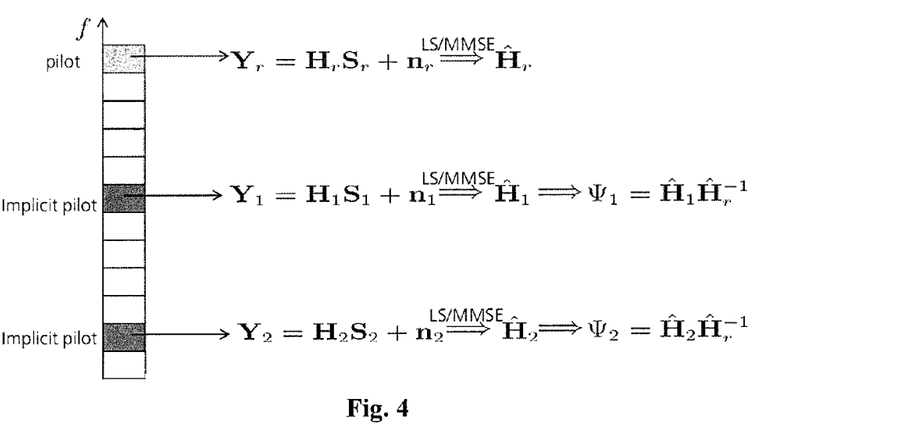
FIG. 4 is a diagram of derivation of an interrelation between channel responses at different frequency points provided in the first embodiment of the invention.

In the embodiment, a subsequent interrelation between the channel response at the transmission frequency point and the channel response at the non-transmission frequency point is $\Psi_i=H_i H_r^{-1}$, as shown in FIG. 4, where i=1, 2, . . . , M, and M is an amount of frequency points at which no reference signal is transmitted.

In Step S305, the reference signal is transmitted at the transmission frequency point.

In the embodiment, frequency points for transmitting the reference signals can be determined according to step S303. For example, the reference signal is transmitted at a frequency point in each spectral interval in which an interrelation of channel responses in frequency domain is stable.

Further, frequency points for transmitting the reference signals can also be determined according to an estimated performance of a channel response at each frequency point. For example, a frequency point with a relatively significant channel response is selected according to a channel response characteristic at each frequency point, and the reference signal is transmitted at the frequency point to obtain relatively high accuracy of estimation of channel responses. Certainly, a frequency point may also be selected randomly in the spectral interval in which the interrelation of channel responses in frequency domain is stable, and the reference signal is transmitted at the frequency point.

In Step S306, a channel response $\hat{H}_r$ at the transmission frequency point is calculated according to a received signal $Y_r$ at the transmission frequency point.

In the embodiment, the channel response $\hat{H}_r$ can be calculated according to a formula $Y_r=H_r S_r+n_r$.

In Step S307, a channel response $H_i$ at the non-transmission frequency point is calculated according to the channel response $\hat{H}_r$ at the transmission frequency point and the interrelation between channel responses at the transmission frequency point and at the non-transmission frequency point.

In the embodiment, the channel response $\hat{H}_i=\Psi_i \hat{H}_r$ at the non-transmission frequency point can be calculated according to the $\hat{H}_r$ calculated in step S306 and the interrelation between channel responses at the transmission frequency point and at the non-transmission frequency point calculated in step S304, where i=1, 2, . . . , M, and M is an amount of frequency points at which no reference signal is transmitted.

In step S308, channel responses in all time domain and frequency domain are estimated by performing interpolation separately or simultaneously in frequency domain and time domain.

Figure 5:
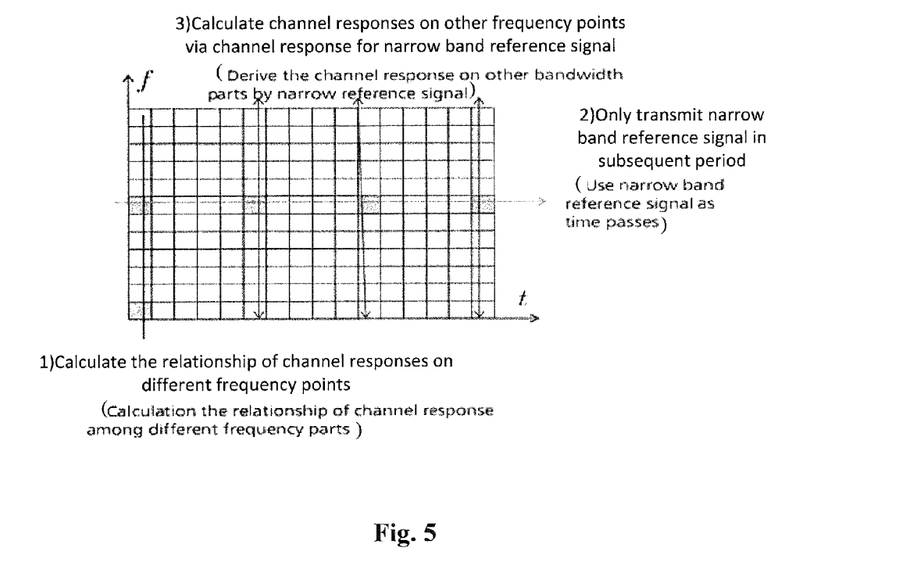
FIG. 5 is a diagram of a process of acquiring channel responses of a self-interference channel via a small amount of reference signals provided in the first embodiment of the invention.

A diagram of a process of acquiring channel responses of a self-interference channel via a small amount of reference signals provided in the first embodiment of the invention is shown in FIG. 5.

In the embodiment, reference signals are transmitted at a small amount of frequency points, and then channel responses at all frequency points can be calculated according to the reference signals transmitted at the small amount of frequency points. Therefore reference signal resource for self-interference channel estimation is saved compared with a condition in conventional technology.

Second Embodiment

Figure 6:
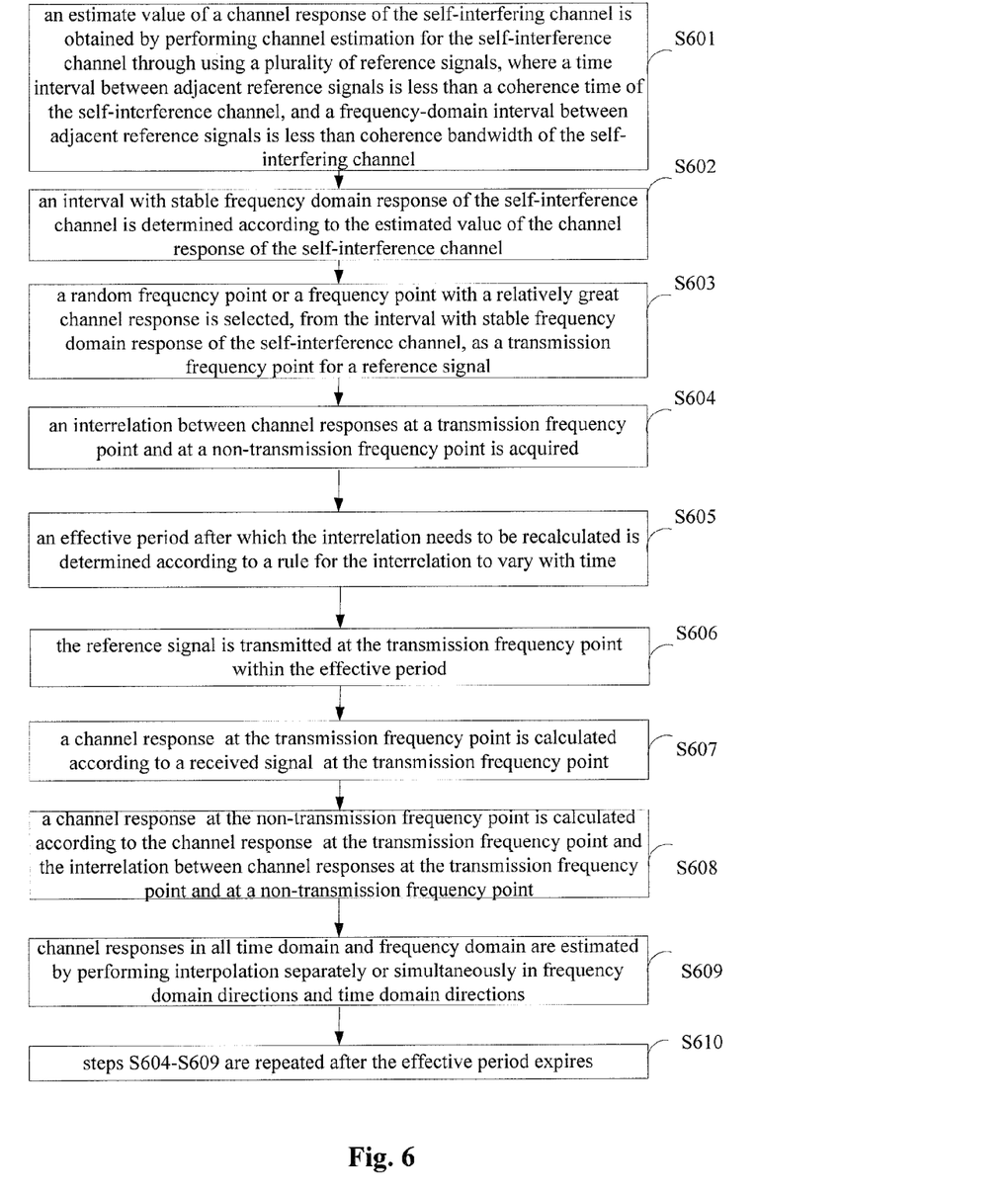
FIG. 6 is a flow chart of implementation of a method for acquiring channel responses of a self-interference channel provided in a second embodiment of the invention.

FIG. 6 is a flow chart of implementation of a method for acquiring channel responses of a self-interference channel provided in a second embodiment of the invention. For convenience of description, the embodiment is described in a scene of an LTE system. The embodiment is also applicable to other OFDM/OFDMA communication systems. In the embodiment, an interrelation between channel responses at different frequency points is considered as varying slowly in frequency domain. Therefore, the interrelation between channel responses at different frequency points is required to be calculated every preset period, which is described in detail as follows:

In Step S601, an estimate value of a channel response of the self-interfering channel is obtained by performing channel estimation for the self-interference channel through using a plurality of reference signals, where a time interval between adjacent reference signals is less than a coherence time of the self-interference channel, and a frequency-domain interval between adjacent reference signals is less than coherence bandwidth of the self-interfering channel.

In Step S602, an interval with stable frequency domain response of the self-interference channel is determined according to the estimate value of the channel response of the self-interference channel.

In Step S603, a random frequency point, or a frequency point with a relatively significant channel response is selected, from the interval with stable frequency domain response of the self-interference channel, as a transmission frequency point for a reference signal.

In Step S604, an interrelation between channel responses at a transmission frequency point and at a non-transmission frequency point is acquired.

In Step S605, an effective period after which the interrelation needs to be recalculated is determined according to a rule for the interrelation to vary with time.

In the embodiment, the rule for the interrelation between the channel responses at the transmission frequency point and at the non-transmission frequency point to vary with time is obtained by calculating, at different moments, the interrelation between the channel responses at the transmission frequency point and at the non-transmission frequency point. For example, if the interrelation varies in 1 minute, then 1 minute is set as the effective period after which the interrelation needs to be recalculated.

In Step S606, the reference signal is transmitted at the transmission frequency point within the effective period.

In Step S607, a channel response $\hat{H}_r$ at the transmission frequency point is calculated according to a received signal $Y_r$ at the transmission frequency point.

In Step S608, a channel response $H_i$ at the non-transmission frequency point is calculated according to the channel response $\hat{H}_r$ at the transmission frequency point and the interrelation between channel responses at the transmission frequency point and at a non-transmission frequency point.

In Step S609, channel responses in all time domain and frequency domain are estimated by performing interpolation separately or simultaneously in frequency domain and time domain.

In Step S610, the steps S604-S609 are repeated after the effective period expires.

In the embodiment, the interrelation between channel responses at different frequency points in frequency domain is not fixed, but varies slowly due to ambient circumference such as temperature and humidity. Therefore, it is required to recalculate the interrelation between channel responses at the transmission frequency point and at the non-transmission frequency point at every effective period by repeating step S604, and then channel responses in all time domain and frequency domain are calculated by steps S605-S609 according to the interrelation.

In the embodiment, the effective period, after which the interrelation needs to be recalculated, is determined according to the rule for the interrelation between channel responses at a transmission frequency point and at a non-transmission frequency point to vary with time. In the effective period, channel responses in all time domain and frequency domain are calculated according to the interrelation; while after the effective period expires, the interrelation between channel responses at a transmission frequency point and at a non-transmission frequency point is reacquired, and channel responses in all time domain and frequency domain are calculated according to the interrelation. The embodiment is applicable to a scene where an interrelation between channel responses at different frequency points is not fixed in frequency domain but varies slowly due to ambient circumference such as temperature and humidity.

Third Embodiment

Figure 7:
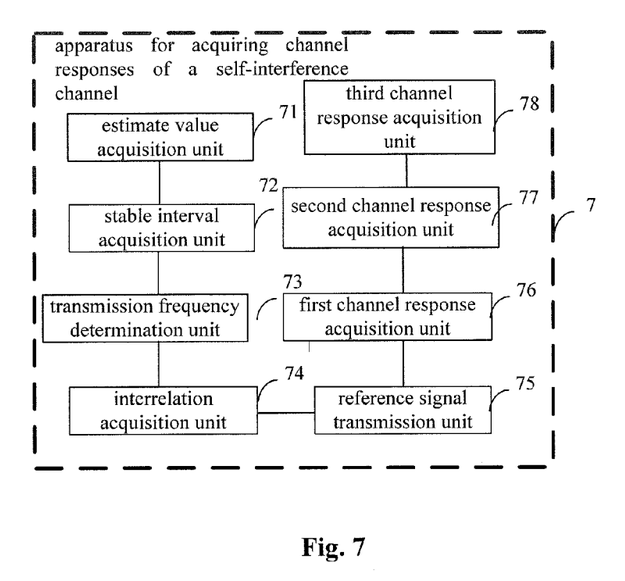
FIG. 7 is a structure block diagram of an apparatus for acquiring channel responses of a self-interference channel provided in a third embodiment of the invention.

FIG. 7 is a structure block diagram of an apparatus for acquiring channel responses of a self-interference channel provided in a third embodiment of the invention. For convenience of description, only parts related to the embodiment are shown. In the embodiment, the apparatus 7 for acquiring channel responses of a self-interference channel may be a software unit, a hardware unit or a unit of a combination of software and hardware, which is built in a full-duplex communication device, and the apparatus for acquiring channel responses of a self-interference channel is applicable to a full-duplex communication device in which an interrelation between channel responses at different frequency points is fixed. The apparatus for acquiring channel responses of a self-interference channel includes: an estimate value acquisition unit 71, a stable interval acquisition unit 72, a transmission frequency point determination unit 73, an interrelation acquisition unit 74, a reference signal transmission unit 75, a first channel response acquisition unit 76, a second channel response acquisition unit 77, and a third channel response acquisition unit 78.

The estimate value acquisition unit 71 is configured to obtain an estimate value of a channel response of the self-interfering channel by performing channel estimation for the self-interference channel through using a plurality of reference signals, where a time interval between adjacent reference signals is less than a coherence time of the self-interference channel, and a frequency-domain interval between adjacent reference signals is less than coherence bandwidth of the self-interfering channel;

The stable interval acquisition unit 72 is configured to determine an interval with stable frequency domain response of the self-interference channel according to the estimate value of the channel response of the self-interference channel;

The transmission frequency point determination unit 73 is configured to select, from the interval with stable frequency domain response of the self-interference channel, a random frequency point or a frequency point with a relatively significant channel response as a transmission frequency point for a reference signal;

The interrelation acquisition unit 74 is configured to acquire an interrelation between channel responses at a transmission frequency point and at a non-transmission frequency point;

The reference signal transmission unit 75 is configured to transmit the reference signal at the transmission frequency point;

The first channel response acquisition unit 76 is configured to calculate a channel response $\hat{H}_r$ at the transmission frequency point according to a received signal $Y_r$ at the transmission frequency point;

The second channel response acquisition unit 77 is configured to calculate a channel response $H_i$ at the non-transmission frequency point according to the channel response at the transmission frequency point and the interrelation between channel responses at the transmission frequency point and at the non-transmission frequency point; and The third channel response acquisition unit 78 is configured to estimate channel responses in all time domain and frequency domain by performing interpolation separately or simultaneously in frequency domain and time domain.

In particular, the interrelation acquisition unit 74 includes: a first channel response acquisition module, a second channel response acquisition module, and an interrelation acquisition module.

The first channel response acquisition module is configured to acquire a channel response at an r-th frequency point, where the r-th frequency point is a transmission frequency point.

The second channel response acquisition module is configured to acquire a channel response at an i-th frequency point, where the i-th frequency point is a non-transmission frequency point.

The interrelation acquisition module is configured to obtain an interrelation between channel responses at a transmission frequency point and at a non-transmission frequency point according to the channel response at the i-th frequency point and the channel response at the r-th frequency point.

For particular operations of each unit, reference may be made to the description of the method according to the first embodiment, which is not repeated here.

It is noted that in this embodiment, besides the apparatus 7 for acquiring channel responses of a self-interference channel, a self-interference channel response acquisition module is further included in the full-duplex communication device, where the elf-interference channel response acquisition module is configured to acquire channel responses in all time domain and frequency domain calculated by the apparatus for acquiring channel responses of the self-interference channel.

Fourth Embodiment

Figure 8:
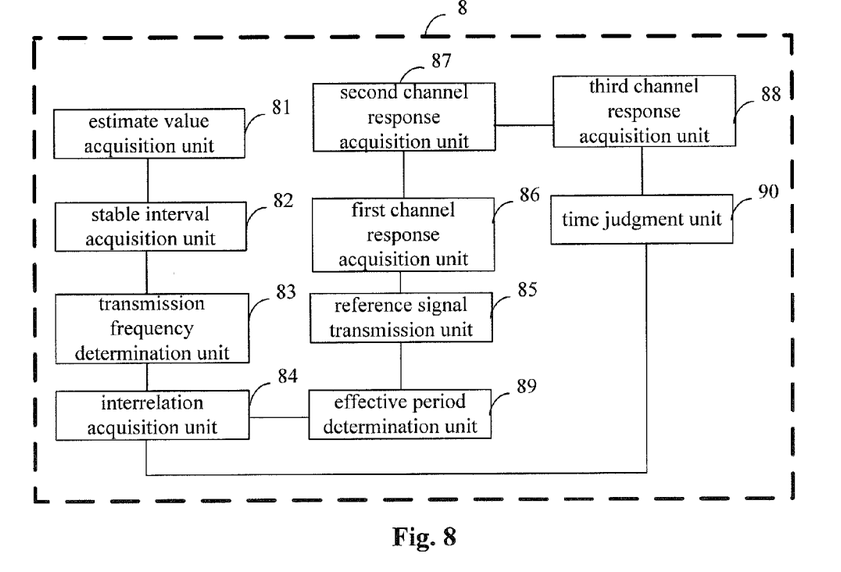
FIG. 8 is a structure block diagram of an apparatus for acquiring channel responses of a self-interference channel provided in a fourth embodiment of the invention.

FIG. 8 is a structure block diagram of an apparatus for acquiring channel responses of a self-interference channel provided in a fourth embodiment of the invention. For convenience of description, only parts related to the embodiment are shown. In the embodiment, the apparatus 8 for acquiring channel responses of a self-interference channel may be a software unit, a hardware unit or a unit of a combination of software and hardware, which is built in a full-duplex communication device, and the apparatus for acquiring channel responses of a self-interference channel is applicable to a full-duplex communication device in which an interrelation between channel responses at different frequency points varies slowly. The apparatus for acquiring channel responses of the self-interference channel includes: an estimate value acquisition unit 81, a stable interval acquisition unit 82, a transmission frequency point determination unit 83, an interrelation acquisition unit 84, a reference signal transmission unit 85, a first channel response acquisition unit 86, a second channel response acquisition unit 87, a third channel response acquisition unit 88, an effective period determination unit 89, and a time judgment unit 90.

The effective period determination unit 89 is configured to determine an effective period after which the interrelation needs to be recalculated according to a rule for the interrelation to vary with time calculated by the interrelation acquisition unit 84, transmit the reference signal at the transmission frequency point and perform subsequent steps within the effective period.

The time judgment unit 90 is configured to obtain channel responses in all time domain and frequency domain by calling the interrelation acquisition unit 84 and other units connected in turn with the interrelation acquisition unit 84.

Functions of the estimate value acquisition unit 81, the stable interval acquisition unit 82, the transmission frequency point determination unit 83, the interrelation acquisition unit 84, the reference signal transmission unit 85, the first channel response acquisition unit 86, the second channel response acquisition unit 87, and the third channel response acquisition unit 88 are the same as those of the estimate value acquisition unit 71, the stable interval acquisition unit 72, the transmission frequency point determination unit 73, the interrelation acquisition unit 74, the reference signal transmission unit 75, the first channel response acquisition unit 76, the second channel response acquisition unit 77, and the third channel response acquisition unit 78 in the third embodiment and are not repeated here.

It is noted that in this embodiment, besides the apparatus 8 for acquiring channel responses of a self-interference channel, a self-interference channel response acquisition module is further included in the full-duplex communication device, where the self-interference channel response acquisition module is configured to acquire channel responses in all time domain and frequency domain calculated by the apparatus for acquiring channel responses of a self-interference channel.

It should be appreciated that, the units included in the forgoing system embodiments are divided merely by logical functions. However, division of the units is not limited to this case, as long as the corresponding functions can be achieved. In addition, the names of the functional units are merely to distinguish the functional units from each other, rather than to limit the scope of the disclosure.

In addition, those skilled in the art can understand that all or a few steps of the methods in the foregoing embodiments can be accomplished by programs instructing related hardware, and corresponding programs may be stored in a computer readable storage medium such as ROM/RAM, disk, and CD, etc.

The above description includes only preferable embodiments of the disclosure, which is not to limit the disclosure. Any modification, equivalent substitution or improvement within the spirit and principle of the disclosure fall in the scope of the disclosure.

What is claimed is:

1. A method for acquiring channel responses of a self-interference channel, comprising:
   obtaining an estimate value of a channel response of the self-interference channel by performing channel estimation for the self-interference channel using a plurality of reference signals, wherein a time interval between adjacent reference signals is less than a coherence time of the self-interference channel, and a frequency-domain interval between adjacent reference signals is less than a coherence bandwidth of the self-interference channel;

determining an interval with stable frequency domain response of the self-interference channel according to the estimate value;

selecting, from the interval with stable frequency domain response, a random frequency point or a frequency point with a relatively significant channel response as a transmission frequency point for a reference signal;

acquiring an interrelation between channel responses at the transmission frequency point and at a non-transmission frequency point;

transmitting the reference signal at the transmission frequency point;

calculating a channel response $\hat{H}_r$ at the transmission frequency point according to a received signal $Y_r$ at the transmission frequency point;

calculating a channel response $H_i$ at the non-transmission frequency point according to the channel response $\hat{H}_r$ at the transmission frequency point and the interrelation between channel responses at the transmission frequency point and at the non-transmission frequency point; and estimating channel responses in a plurality of time domains and frequency domains via interpolation.

2. The method according to claim 1, wherein after acquiring the interrelation between channel responses at the transmission frequency point and at the non-transmission frequency point, the method further comprises: determining, according to a rule for the interrelation to vary with time, an effective period after which the interrelation is to be recalculated;

wherein the reference signal is transmitted at the transmission frequency point within the effective period;

wherein the channel responses in the plurality of time domains and frequency domains are calculated based on the reference signal;

wherein after estimating the channel responses, the method further comprises: re-obtaining the interrelation between channel responses at the transmission frequency point and at the non-transmission frequency point after the effective period expires, and re-calculating channel responses in a plurality of time domains and frequency domains according to the re-obtained interrelation.

3. The method according to claim 1, wherein acquiring the interrelation between channel responses at the transmission frequency point and at the non-transmission frequency point further comprises:

acquiring a channel response at an r-th frequency point, wherein the r-th frequency point is the transmission frequency point;

acquiring a channel response at an i-th frequency point, wherein the i-th frequency point is the non-transmission frequency point; and obtaining the interrelation between channel responses at the transmission frequency point and at the non-transmission frequency point based on the channel response at the i-th frequency point and the channel response at the r-th frequency point.

4. An apparatus for acquiring channel responses of a self-interference channel, comprising a processor and a non-transitory processor-readable medium, the processor-readable medium comprising processor-executable instructions including a plurality of units, the units comprising:

an estimate value acquisition unit, configured to obtain an estimate value of a channel response of the self-interference channel by performing channel estimation for the self-interference channel using a plurality of reference signals, wherein a time interval between adjacent reference signals is less than a coherence time of the self-interference channel, and a frequency-domain interval between adjacent reference signals is less than a coherence bandwidth of the self-interference channel;

a stable interval acquisition unit, configured to determine an interval with stable frequency domain response of the self-interference channel according to the estimate value;

a transmission frequency point determination unit, configured to select, from the interval with stable frequency domain response of the self-interference channel, a random frequency point or a frequency point with a relatively significant channel response as a transmission frequency point for a reference signal;

an interrelation acquisition unit, configured to acquire an interrelation between channel responses at the transmission frequency point and at a non-transmission frequency point;

a reference signal transmission unit, configured to cause the reference signal to be transmitted at the transmission frequency point;

a first channel response acquisition unit, configured to calculate a channel response $\hat{H}_r$ at the transmission frequency point according to a received signal $Y_r$ at the transmission frequency point;

a second channel response acquisition unit, configured to calculate a channel response $H_i$ at the non-transmission frequency point according to the channel response $\hat{H}_r$ at the transmission frequency point and the interrelation between channel responses at the transmission frequency point and at the non-transmission frequency point; and a third channel response acquisition unit, configured to estimate channel responses in a plurality of time domains and frequency domains via interpolation.

5. The apparatus according to claim 4, further comprising:

an effective period determination unit, configured to determine, according to a rule for the interrelation to vary with time, an effective period after which the interrelation needs to be recalculated; and a time judgment unit, configured to re-obtain the interrelation between channel responses at the transmission frequency point and at the non-transmission frequency point after the effective period expires, and to cause the channel responses in a plurality of time domains and frequency domains to be re-calculated according to the re-obtained interrelation.

6. The apparatus according to claim 4, wherein the interrelation acquisition unit further comprises:

a first channel response acquisition module, configured to acquire a channel response at an r-th frequency point, wherein the r-th frequency point is the transmission frequency point;

a second channel response acquisition module, configured to acquire a channel response at an i-th frequency point, wherein the i-th frequency point is the non-transmission frequency point; and an interrelation acquisition module, configured to obtain the interrelation between channel responses at the transmission frequency point and at the non-transmission frequency point based on the channel response at the i-th frequency point and the channel response at the r-th frequency point.

7. A full-duplex communication device, comprising an apparatus for acquiring channel responses of a self-interference channel, and a self-interference channel response acquisition module;
   wherein the apparatus for acquiring channel responses of a self-interference channel, comprises a processor and a non-transitory processor-readable medium, the processor-readable medium comprising processor-executable instructions including a plurality of units, the units comprising:
   an estimate value acquisition unit, configured to obtain an estimate value of a channel response of the self-interference channel by performing channel estimation for the self-interference channel using a plurality of reference signals, wherein a time interval between adjacent reference signals is less than a coherence time of the self-interference channel, and a frequency-domain interval between adjacent reference signals is less than a coherence bandwidth of the self-interference channel;
   a stable interval acquisition unit, configured to determine an interval with stable frequency domain response of the self-interference channel according to the estimate value;
   a transmission frequency point determination unit, configured to select, from the interval with stable frequency domain response of the self-interference channel, a random frequency point or a frequency point with a relatively significant channel response as a transmission frequency point for a reference signal;
   an interrelation acquisition unit, configured to acquire an interrelation between channel responses at the transmission frequency point and at a non-transmission frequency point;
   a reference signal transmission unit, configured to cause the reference signal to be transmitted at the transmission frequency point;
   a first channel response acquisition unit, configured to calculate a channel response $\hat{H}_r$ at the transmission frequency point according to a received signal $Y_r$ at the transmission frequency point;
   a second channel response acquisition unit, configured to calculate a channel response $H_i$ at the non-transmission frequency point according to the channel response $\hat{H}_r$ at the transmission frequency point and the interrelation between channel responses at the transmission frequency point and at the non-transmission frequency point; and
   a third channel response acquisition unit, configured to estimate channel responses in a plurality of time domains and frequency domains via interpolation; and
   wherein the self-interference channel response acquisition module is configured to acquire the channel responses in the plurality of time domains and frequency domains estimated by the apparatus.

8. The full-duplex communication device according to claim 7, wherein the apparatus further comprises:
   an effective period determination unit, configured to determine, according to a rule for the interrelation to vary with time, an effective period after which the interrelation needs to be recalculated; and
   a time judgment unit, configured to re-obtain the interrelation between channel responses at the transmission frequency point and at the non-transmission frequency point after the effective period expires, and to cause the channel responses in a plurality of time domains and frequency domains to be re-calculated according to the re-obtained interrelation.

9. The full-duplex communication device according to claim 7, wherein the interrelation acquisition unit further comprises:
   a first channel response acquisition module, configured to acquire a channel response at an r-th frequency point, wherein the r-th frequency point is the transmission frequency point;
   a second channel response acquisition module, configured to acquire a channel response at an i-th frequency point, wherein the i-th frequency point is the non-transmission frequency point; and
   an interrelation acquisition module, configured to obtain the interrelation between channel responses at the transmission frequency point and at the non-transmission frequency point based on the channel response at the i-th frequency point and the channel response at the r-th frequency point.

* * * * *

UNITED STATES PATENT AND TRADEMARK OFFICE
CERTIFICATE OF CORRECTION

| | | |
|---|---|---|
| PATENT NO. | : 9,504,048 B2 | Page 1 of 1 |
| APPLICATION NO. | : 14/577328 | |
| DATED | : November 22, 2016 | |
| INVENTOR(S) | : Cheng et al. | |

It is certified that error appears in the above-identified patent and that said Letters Patent is hereby corrected as shown below:

On the Title Page

Item (72), city and country for inventor Hong Cheng should read -- Shenzhen (CN) --.

Item (72), city and country for inventor Rui Wang should read -- Shenzhen (CN) --.

Item (72), city and country for inventor Yinggang Du should read -- Shenzhen (CN) --.

Signed and Sealed this
Twenty-eighth Day of February, 2017

Michelle K. Lee
*Director of the United States Patent and Trademark Office*